Feb. 11, 1936.  W. J. BELCHER  2,030,829
CHAIN
Filed April 25, 1934   3 Sheets-Sheet 2
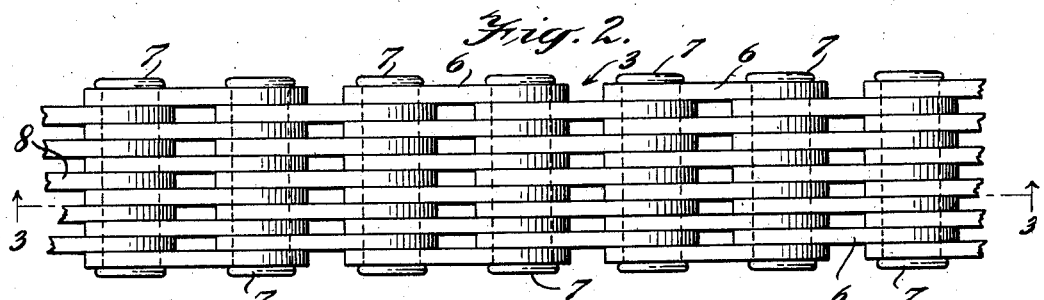
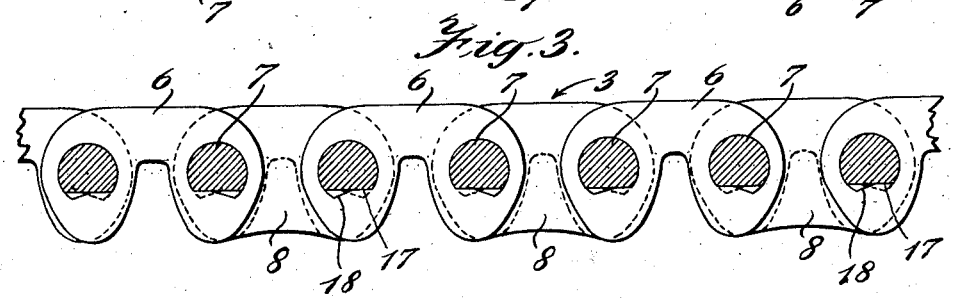
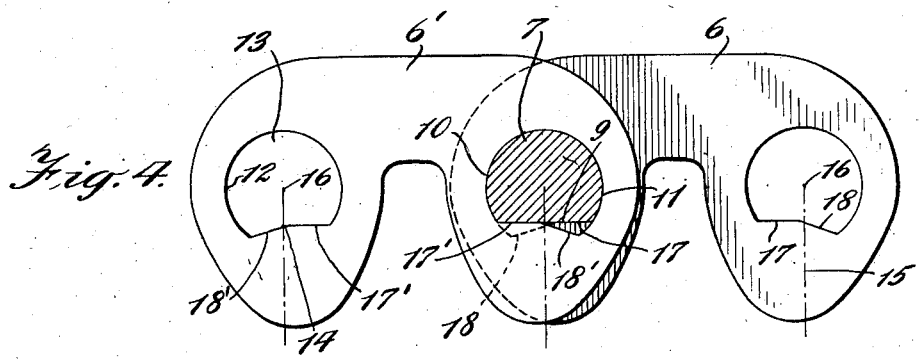
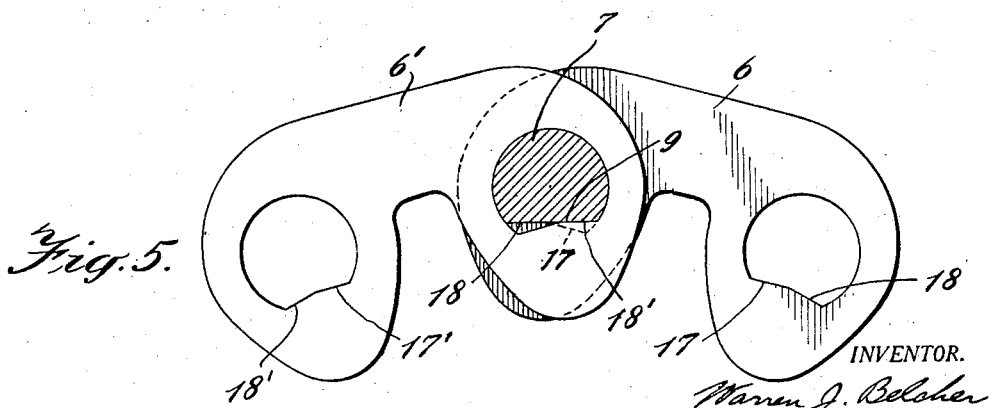
INVENTOR.
Warren J. Belcher
BY
Gifford, Scull & Burgess
ATTORNEYS.

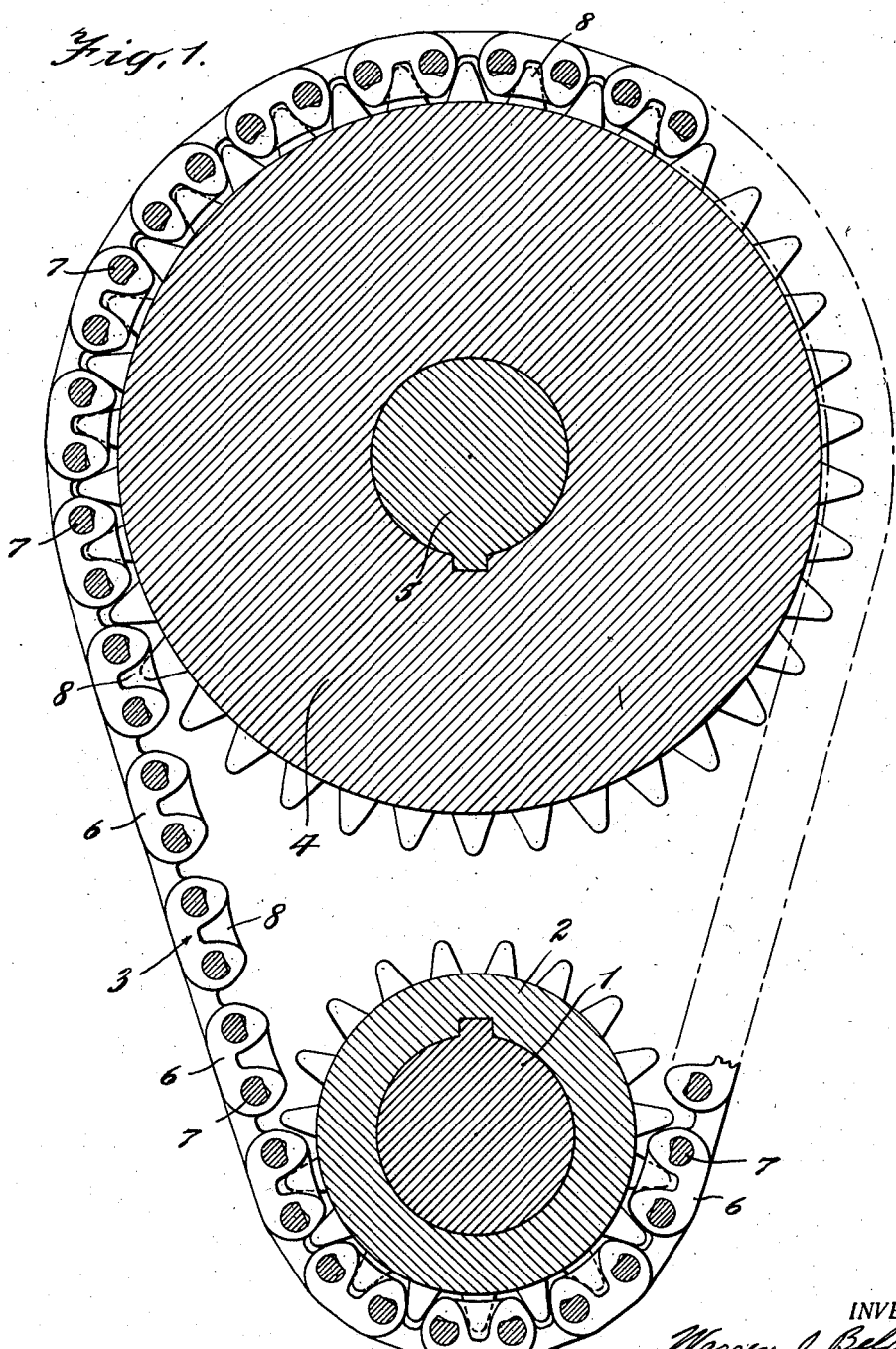

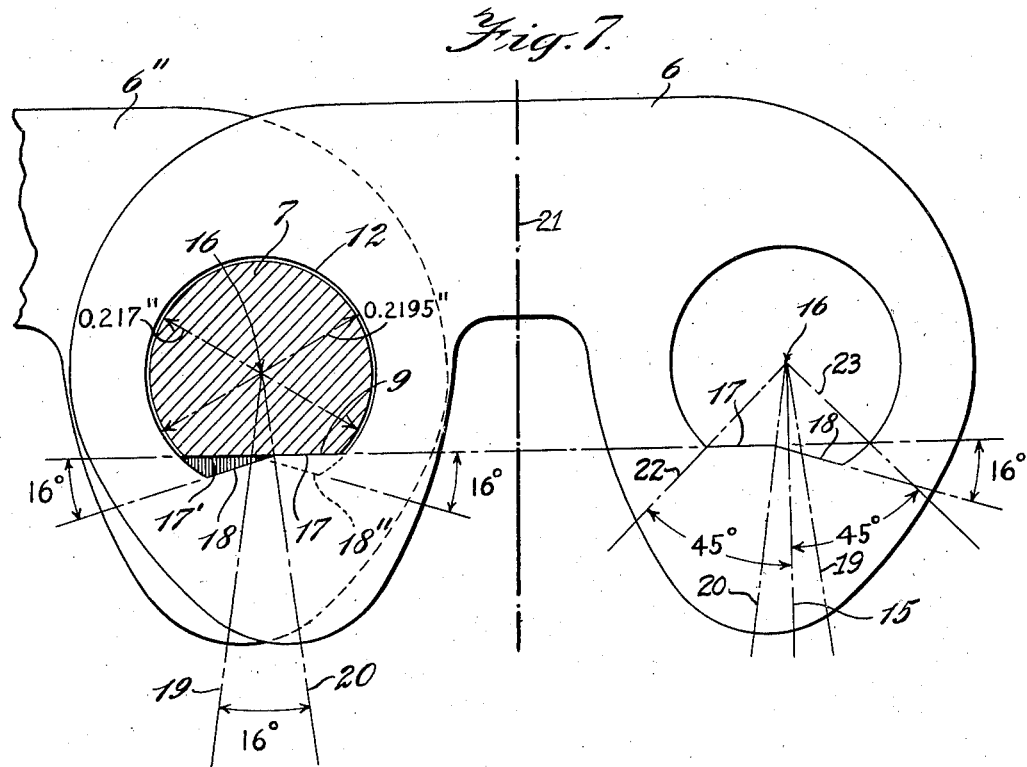
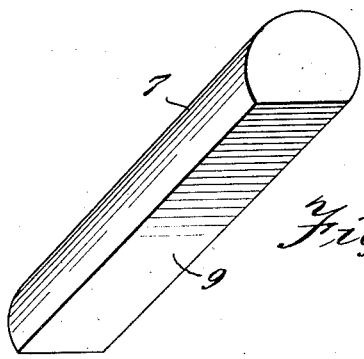

Patented Feb. 11, 1936

2,030,829

UNITED STATES PATENT OFFICE 2,030,829

CHAIN

Warren J. Belcher, West Hartford, Conn., assignor to The Whitney Chain & Mfg. Company, a corporation of Connecticut Application April 25, 1934, Serial No. 722,249

11 Claims. (Cl. 74—251)

This invention relates to a novel and improved form of chain, the novel features of which will be best understood from the following description and the annexed drawings, in which I have shown a selected embodiment of the invention and in which:

Fig. 1 is a view showing a drive which may be operated by a chain of the form claimed herein and from which some of the advantages of the invention will appear;

Fig. 2 is a plan view of a section of chain as viewed from the back thereof and which chain may have the invention incorporated therein;

Fig. 3 is a section taken approximately on the line 3—3 of Fig. 2;

Fig. 4 is a fragmentary view on an enlarged scale of some of the chain appearing in Fig. 3 and illustrating part of the operation of the chain according to this invention;

Fig. 5 is a view similar to Fig. 4 and showing the two links appearing in Fig. 4 but in different positions;

Fig. 6 is a perspective view of one of the novel pivot pins forming part of the invention;

Fig. 7 is a view on a still further enlarged scale showing the relation of the novel link to the novel pivot pin.

Referring first to Fig. 1, I have shown therein two shafts having sprockets thereon and driven one from the other by means of a chain. For example, the shaft 1 may be a driving shaft having a sprocket 2 thereon with teeth which engage the teeth on the chain 3 which, through engagement with teeth on a sprocket 4 on the shaft 5, drive that shaft. As wear takes place in a chain, elongation of the chain follows and a vibration will occur in the chain which increases the wear and also causes undesirable noise. Much of this trouble can be avoided by preventing what is called "back-bending" of the chain or, in other words, a bending of the chain in a direction reverse to that in which it bends as it passes around the sprockets. In this connection and for the sake of convenience I shall refer to the side of the chain which is adjacent the sprockets as the front of the chain, and the other side thereof as the back.

My invention relates to a novel manner of preventing such back-bending by a construction which has numerous advantages, some of which will be pointed out during the following description.

Referring more particularly to Figs. 2 and 3, it will be seen that the chain 3 comprises a plurality of pitches of links 6, with the links in adjacent pitches overlapping each other and pivotally connected by means of pivot pins 7 which extend through aligned holes in the overlapping portions of the links. This type of chain shown herein is generally called a "silent" type, although the invention may be applied to other forms of chain where found applicable. The chain shown may also be provided with one or more rows of guide plates 8, here shown as centrally disposed in the chain and which may engage in grooves in the teeth on the respective sprockets to prevent lateral displacement of the chain, all in a manner well known in the art.

I prevent back-bending by a novel construction of pivot pin and link and, of course, it will be understood in this connection that the word "link" is used broadly, as the construction of link described here may be applied to the guide plates as well as to the toothed links which have been selected for the purpose of illustration.

Referring now more particularly to Figs. 4, 5, 6 and 7, I have shown in Figs. 4 and 5 two adjoining links 6 and 6' connected together by a pivot pin 7. It will be seen that the pin 7 is generally cylindrical in form, but is provided with a flat surface 9 which forms a chord of the cylinder of which the major portion of the pin is comprised. Usually, pivot pins have cylindrical bearing surfaces throughout their extent, and such a bearing surface contacts with similarly shaped walls of the holes in the links through which the pivot pins pass. Since the chain is normally under tension when in use, the greatest wear on a pivot pin comes on the portions 10 and 11 of the pin extending transversely to the length of the chain, and on opposite sides of the pin along the length of the chain. This wear in time results in elongation of the chain, and, in many prior art chains designed to prevent back-bending, the anti-back-bending means is affected by such elongation of the chain.

According to my invention, I leave the pin with substantially the same bearing surface transversely to the length of the chain, where the greatest wear takes place, as in an ordinary cylindrical pin, and place the surface 9 extending lengthwise of the chain and preferably parallel to the longitudinal axis of the chain when straight. This means that the opposite sides 10 and 11 of the pin may still have substantially their normal bearing contact with the cylindrically shaped wall 12 of the hole 13 in a link, and therefore the wear resisting properties of the chain are left substantially undiminished.

The walls of the holes 13 are circular through the major part of their extent, but, instead of the entire hole being completely circular, it is formed with a re-entrant angle 14 having its apex disposed at one side of a line 15 through the center of the circular part of the hole and perpendicular to the longitudinal axis of the chain when straight. This longitudinal axis may be defined as a line which is disposed in a plane extending through the various centers 16 of the circular parts of the holes 13 when the chain is straight. This longitudinal axis of the chain may also be conveniently referred to as the longitudinal axis of any link in the chain. It will be noted that the two wall portions 17 and 18 are unequal in length, and that one of these portions is parallel to the longitudinal axis of the link, in the illustrated embodiment.

The pivot pin passes through holes 13 in overlapping links, and, normally, these holes will be of the same size and shape in all links in the chain. The pin may be said to have a sliding fit in the holes, so that the links may rotate with respect to the pin. When the chain is assembled, it will be seen that the flat surface 9 will contact with one portion 17 of the hole wall and a portion 17' of the hole wall in the adjoining link. In other words, it will contact with those portions of the hole walls which are parallel to the longitudinal axis of the chain when straight. These wall portions 17 and 17' thus form abutments contacting with abutments on the pin, the pin abutments in the illustrated form being parts of the single flat surface 9.

It will also be seen that the short abutments 17 in any one link are nearer the longitudinal center 21 thereof, while the hole walls have long abutments 18, which are disposed near the ends of the links.

Referring now to Fig. 4, the pin 7 shown therein is seen to have its abutments in contact with the abutment 17 of the link 7 and with the abutment 17' of the link 6'. At the same time, the abutments 18 and 18' are out of contact with the abutments of the pin. As pointed out above, the abutments on the pin are, in this form, a continuous surface, although they may be varied if found expedient.

In Fig. 5, wherein I have shown the same links and pin as in Fig. 4, it will be seen that, while the pin has remained unchanged, nevertheless both the links have rotated thereon so that now the surface 9 forming the abutments of the pin is in contact with the abutments 18 and 18' of the respective links. The movement from the position shown in Fig. 4 to that shown in Fig. 5 may occur by simultaneous movement of the two links with respect to the pin or by movement, first, of one link and then of the other, in any case the movement of any link on the pin being limited by engagement of the respective abutments. The position shown in Fig. 5 is one which the links will take when engaging the teeth of a sprocket, and, of course, the abutments may be so designed as to provide a sufficiently great movement so that the chain may engage the sprocket with which it is designed to be used.

When the chain leaves the sprocket and straightens out, it will be seen that the abutments 17 and 17' will limit the motion of the links so that the chain cannot bend backwardly beyond a straight position or, in other words, so that the chain cannot back-bend.

Referring particularly to Fig. 7, I have shown therein one link of certain dimensions and have also shown a pin and a fragment of an adjoining link. The angles and dimensions shown are illustrative only and as showing what the relation of the parts may be in one selected embodiment.

In Fig. 7 I have identified the two links as 6 and 6'', it being noted that the link 6'' is shown as being behind the link 6, whereas in Figs. 4 and 5 the link 6' is shown as in front of the link 6. The pin 7 may have a diameter of 0.217'', and the circular part 12 of the hole wall may have a diameter of 0.2195'', these dimensions being typical of what I mean when I say that the pin has a sliding fit in the hole in the link. The angle formed between any abutment 18 or 18'' with a line parallel to the longitudinal axis of the link or chain may be taken as 16°, and I have found satisfactory results to be achieved when the same angle is used between the two radial lines 19 and 20 extending from the center 16 through the respective apices of the re-entrant angles. The extent of the surface 9 on the pin 20 may, for example, with the other angles and dimensions shown, be on a chord sub-tending a central angle of 90°, 45° on either side of the line 15. This angle is indicated at the right of Fig. 7 and is bounded by the lines 22 and 23 shown in that figure.

I have given the above proportions and dimensions as typical ones which have been used on one chain constructed according to this invention, and, of course, it will be understood by those skilled in the art that these dimensions may be varied for chain of different sizes and different uses.

From the above it will be seen that I have devised a novel form of chain which will prevent back-bending, while not requiring extended modification of existing chain structure. The links and pins may be easily made in the form which I have shown, without extensive change of existing machinery, and all the parts may be assembled on assembly machines. The pins may be formed by drawing, in the same manner as if they were perfectly cylindrical in form, and in fact may be manufactured in the same general manner as standard pins now in use.

It will also be seen that the pins and links may pivot freely with respect to each other, sufficiently for the purpose for which the chain is designed, the cylindrical wall of any hole being greater in circumferential extent than the circumferential extent of the cylindrical bearing surface of the pin in that hole, so that all pivoting movement is on cylindrical surfaces.

It will also be seen that the surfaces which take the wear due to the tension on the chain extend transversely of the chain, as usual, and that these surfaces do not come into use to prevent back-bending. On the contrary, the surfaces which do prevent back-bending are in the form of abutments extending generally lengthwise of the chain. These abutments have been shown as being towards the front of the chain, although this position could be reversed if found expedient, and such abutments could be placed toward the back of the chain. In either case, the abutments preventing back-bending act independently of the surfaces which are subject to wear and which prevent elongation, and therefore elongation does not increase the tendency to back-bending.

While I have shown the invention as embodied in a specific form, it is to be understood that various changes in details may be made without departing from the scope of the invention, and I therefore do not intend to limit myself except by the appended claims.

I claim:

1. A chain comprising overlapping links having aligned holes therein, said holes having walls of cylindrical form towards the back of the chain and with two abutments towards the front of the chain, said abutments making an angle with each other, a pin extending through said holes transversely of the length of the chain, said pin having a bearing surface of cylindrical form in sliding contact with, but of less circumferential extent than, the cylindrically shaped walls of said holes, whereby said links may turn on said pin, and abutments on said pin extending lengthwise of the chain and adapted to engage the abutments on the hole walls to limit said turning of the links on the pin.

2. A chain comprising overlapping links having aligned holes therein, said holes having walls of cylindrical form towards the back of the chain and with two abutments towards the front of the chain, said abutments making an angle with each other, a pin extending through said holes transversely of the length of the chain, said pin having a bearing surface of cylindrical form in sliding contact with, but of less circumferential extent than, the cylindrically shaped walls of said holes, whereby said links may turn on said pin, and abutments on said pin extending lengthwise of the chain and adapted to engage the abutments on the hole walls to limit said turning of the links on the pin, said abutments on the pin being in the form of a continuous flat surface.

3. A chain comprising overlapping links having aligned holes therein, said holes having walls of cylindrical form towards one face of the chain and with two abutments towards the other face of the chain, said abutments making an angle with each other and one of them being parallel to the longitudinal axis of the chain when straight, a pin extending through said holes transversely of the length of the chain, said pin having a bearing surface of cylindrical form in sliding contact with, but of less circumferential extent than, the cylindrically shaped walls of said holes whereby said links may turn on said pin, and a surface on said pin adapted to engage an abutment on each of two overlapping links when the chain is straight and thus prevent back-bending of the chain.

4. A chain link having a hole therethrough for the reception of a pivot pin, said hole having a wall of cylindrical form for more than half of its periphery, the rest of the periphery thereof comprising two abutments forming a re-entrant angle between them and one of them disposed parallel to the longitudinal axis of the link.

5. A chain link having two holes therethrough for the reception of pivot pins, each of said holes having a wall of cylindrical form for more than half of its periphery, with the rest of the periphery of each hole comprising two abutments forming a re-entrant angle between them and extending generally lengthwise of the link, one abutment in one hole being in line with an abutment in the other hole and parallel to the longitudinal axis of the link.

6. A chain link having two holes therethrough for the reception of pivot pins, each of said holes having a wall of cylindrical form for more than half of its periphery, with the rest of the periphery of each hole comprising two abutments forming a re-entrant angle between them and extending generally lengthwise of the link, one abutment in each hole being shorter than the other abutment in the same hole, and the two shorter abutments being disposed nearer the longitudinal center of a link than the longer abutments.

7. A chain link having two holes therethrough for the reception of pivot pins, each of said holes having a wall of cylindrical form for more than half of its periphery, with the rest of the periphery of each hole comprising two abutments forming a re-entrant angle between them and extending generally lengthwise of the link, one abutment in each hole being shorter than the other abutment in the same hole, and the two shorter abutments being disposed nearer the longitudinal center of a link than the longer abutments and in line with each other.

8. A chain link having a hole therethrough for the reception of a pivot pin, said hole having a wall of cylindrical form for more than half of its periphery, the rest of the periphery thereof comprising two abutments forming a re-entrant angle between them and one of them disposed parallel to the longitudinal axis of the link, and the apex of said angle being disposed at one side of a line perpendicular to said axis and extending through the center of said cylinder.

9. A chain link having a hole therethrough for the reception of a pivot pin, said hole having a wall of cylindrical form for more than half of its periphery, the rest of the periphery thereof comprising two abutments forming a re-entrant angle between them and one of them disposed parallel to the longitudinal axis of the link, and the apex of said angle being disposed nearer the longitudinal center of the link than a line perpendicular to said axis and extending through the center of said cylinder.

10. A chain comprising two overlapping links having aligned holes therein, each of said holes having a wall of cylindrical form for more than one-half its periphery, the rest of the periphery thereof comprising two abutments forming a re-entrant angle between them, and a pin extending through said holes and having a cylindrically shaped surface in sliding contact with the cylindrically shaped walls of said holes and having a flat surface adapted to contact with an abutment in one link on one side of the axis of the pin and with an abutment in the other link on the other side of said axis, said last-named abutments being in line with each other when the chain is straight and when they are in contact with said flat surface on the pin.

11. A chain comprising two overlapping links having aligned holes therein, each of said holes having a wall of cylindrical form for more than one-half its periphery, the rest of the periphery thereof comprising two abutments forming a re-entrant angle between them, a pin extending through said holes and having a cylindrically shaped surface in sliding contact with the cylindrically shaped walls of said holes and having a flat surface adapted to contact with an abutment in one link on one side of the axis of the pin and with an abutment in the other link on the other side of said axis, said last-named abutments being in line with each other when the chain is straight and when they are in contact with said flat surface on the pin, and the apices of said angles being disposed on opposite sides of said axis of the pin when the chain is straight.

WARREN J. BELCHER.